United States Patent [19]

Stevens et al.

[11] Patent Number: 5,571,621

[45] Date of Patent: Nov. 5, 1996

[54] INFRARED RADIATION-INTERACTIVE ARTICLE, AND METHOD OF GENERATING A TRANSIENT INFRARED RADIATION RESPONSE

[75] Inventors: Ward C. Stevens, New Fairfield; Edward A. Sturm, New Milford, both of Conn.

[73] Assignee: Advanced Technology Materials, Inc., Danbury, Conn.

[21] Appl. No.: 487,836

[22] Filed: Jun. 7, 1995

Related U.S. Application Data

[63] Continuation-in-part of Ser. No. 273,356, Jul. 11, 1994, which is a continuation-in-part of Ser. No. 734,199, Jul. 22, 1991, Pat. No. 5,328,717, which is a division of Ser. No. 448,252, Dec. 11, 1989, Pat. No. 5,034,274.

[51] Int. Cl.[6] ........................................................ B32B 9/00
[52] U.S. Cl. ................... 428/389; 428/359; 428/364; 428/367; 428/375; 428/379; 428/381; 428/384; 428/392; 428/336
[58] Field of Search ...................... 428/389, 359, 428/364, 367, 375, 379, 381, 384, 392

[56] References Cited

U.S. PATENT DOCUMENTS

| | | | |
|---|---|---|---|
| 2,682,783 | 12/1958 | Drummond | 18/54 |
| 2,818,351 | 12/1957 | Nack et al. | 117/107 |
| 2,920,981 | 1/1960 | Whitehurst | 117/71 |
| 2,930,105 | 3/1960 | Budd | 28/80 |
| 3,097,941 | 7/1963 | Toulmin, Jr. | 65/3 |
| 3,129,487 | 4/1964 | Whitacre et al. | 18/75 |
| 3,221,875 | 12/1965 | Paquette | 206/65 |
| 3,372,051 | 3/1968 | Stalego | 117/69 |
| 3,544,997 | 12/1970 | Turner et al. | 343/18 |
| 3,549,412 | 12/1970 | Frye et al. | 117/110 |
| 3,752,927 | 4/1973 | Fiedler | 343/18 |
| 3,765,931 | 10/1973 | Kyri et al. | 117/129 |
| 3,952,307 | 4/1976 | Nagler | 343/18 |
| 4,052,530 | 10/1977 | Fonzi | 428/469 |
| 4,556,507 | 12/1985 | Tomibe et al. | 252/518 |
| 4,738,896 | 4/1988 | Stevens | 428/315.9 |
| 4,759,950 | 7/1988 | Stevens | 427/55 |
| 4,852,453 | 8/1989 | Morin | 89/1.11 |
| 4,942,090 | 8/1989 | Morin | 428/367 |
| 5,034,274 | 7/1991 | Stevens et al. | 428/469 |
| 5,039,990 | 8/1991 | Stevens et al. | 342/12 |
| 5,087,515 | 2/1992 | Stevens et al. | 428/315.9 |
| 5,352,519 | 10/1994 | Stevens et al. | 428/389 |

OTHER PUBLICATIONS

Butters, Brian C. F., "Electronic Countermeasures/Chaff", IEEE Proceedings, vol. 129, Part F, No. 3, Jun. 1982, pp. 197–201.

Mack, C. L. Jr. and B. Reiffen, "RF Characteristics of Thin Dipoles," IEEE Proceedings, vol. 52, May 1964, pp. 533–542.

Van Vleck, J. H. et al., "Theory of Radar Reflection from Wires of Thin Metallic Strips," Journal of Applied Physics, vol. 18, Mar. 1947, pp. 274–294.

Grant, P. M. et al., "Introduction to Electronic Warfare," IEE Proc., vol. 129, Prt. F., No. 3, Jun. 1982, pp. 113–132.

Wickliff, R. G. and R. J. Garbacz, "The Average Backscattering Cross Section of Clouds of Randomized resonant Dipoles," IEEE Trans. AP 22, May 1974, pp. 503–505.

*Primary Examiner*—Patrick Ryan
*Assistant Examiner*—Cathy K. Lee
*Attorney, Agent, or Firm*—Steven J. Hultquist

[57] ABSTRACT

An infrared radiation-interactive article comprising a supported or unsupported oxidizable metal film of an infrared radiation-interactive size and shape, with an oxidation-promoting salt in contact with the metal film, arranged so that in exposure to ambient moisture, the metal film is oxidizable to an infrared radiation non-interactive form. The article of the invention may be employed to carry out a method of generating a transient infrared radiation response, e.g., an infrared radiation reflectance signature, or infrared radiation absorption, at a selected locus receiving infrared radiation incident thereon, by disposing at the locus an infrared radiation interactively-effective amount of such infrared radiation-interactive article.

15 Claims, 1 Drawing Sheet

INFRARED RADIATION-INTERACTIVE ARTICLE, AND METHOD OF GENERATING A TRANSIENT INFRARED RADIATION RESPONSE

CROSS-REFERENCE TO RELATED APPLICATIONS

This application is a continuation-in-part of U.S. application Ser. No. 08/273,356 filed Jul. 11, 1994, which is a continuation-in-part of U.S. application Ser. No. 07/734,199 filed Jul. 22, 1991, and issued Jul. 12, 1994 as U.S. Pat. No. 5,328,717, which is a division of U.S. application Ser. No. 07/448,252 filed Dec. 11, 1989, now U.S. Pat. No. 5,034,274. U.S. application Ser. No. 07/448,252 was co-filed with the following related applications, all assigned to the assignee hereof: U.S. application Ser. No. 07/449,708 filed Dec. 11, 1989 in the names of Ward C. Stevens, Edward A. Sturm, and Delwyn F. Cummings, for "GALVANICALLY DISSIPATABLE EVANESCENT CHAFF FIBERS, AND METHOD OF MAKING THE SAME," issued as U.S. Pat. No. 5,039,990; U.S. application Ser. No. 07/450,585 filed Dec. 11, 1989 in the names of Ward C. Stevens, Edward A. Sturm, and Bruce C. Roman for "SULFURIZED CHAFF FIBER HAVING AN EVANESCENT RADAR REFLECTANCE CHARACTERISTIC, AND METHOD OF MAKING THE SAME," abandoned in favor of continuation-in-part U.S. application Ser. No. 07/982,393 filed Nov. 27, 1992, issued Oct. 4, 1994 as U.S. Pat. No. 5,352,519; and U.S. application Ser. No. 07/449,695 filed Dec. 11, 1989 in the names of Ward C. Stevens, Edward A. Sturm, and Bruce C. Roman, for "CHAFF FIBER COMPRISING INSULATIVE COATING THEREON, AND HAVING AN EVANESCENT RADAR REFLECTANCE CHARACTERISTIC, AND METHOD OF MAKING THE SAME," now U.S. Pat. No. 5,087,515.

BACKGROUND OF THE INVENTION

1. Field of the Invention

This invention relates to an article with transient infrared radiation response characteristics, having utility as an electronic warfare countermeasure, e.g., for anti-detection masking of an offensive attack. The invention also relates to an appertaining method of use of such article, to mask an infrared radiation response when deployed in an area susceptible to infrared radiation monitoring.

2. Description of the Related Art

In modem warfare, a wide variety of weapons systems are employed which operate across the electromagnetic spectrum, including radio waves, microwaves, infrared signals, ultraviolet signals, x-rays and gamma rays.

Infrared countermeasures therefore are becoming of greater importance to the U.S. military, particularly in the context of proliferation of heat-seeking missiles and infrared guided arms in military arsenals. Infrared countermeasures fall into two primary groups: decoys and smokes.

Infrared decoys typically take the form of flares or active metal compositions which in use yield a thermal response simulating the thermal signature of an endangered target for some predetermined period of time.

Infrared smoke can be constituted by warm clouds of gases or clouds of attenuating particles. Both graphite flake and brass flake materials have been employed as smoke-forming materials which obscure infrared targets for military operations. This obscuration is accomplished by absorption and/or diffuse scattering of the incident infrared radiation. Fixed and slow moving "assets" can thus be protected by deploying a 'smoke' cloud between the asset and the threat. Unfortunately, the properties of previously demonstrated graphite and brass infrared radiation obscuration materials remain unchanged and these materials persist indefinitely in the environment. Although the enemy cannot see beyond the infrared-obscuring cloud, neither can friendly forces, thus rendering the friendly force weaponry and monitoring equipment correspondingly useless.

In addition to such deficiency of graphitic or brass flake smoke materials, brass is toxic in character, while both graphite and brass have very stable electrical conductivity and thus can affect the environment in which they are deployed for long periods of time.

Accordingly, there is a need in the art for an infrared radiation countermeasure, which is able to be deployed readily to provide a transient infrared radiation response characteristic, which is non-toxic in character, and which is environmentally benign.

It therefore is an object of the present invention to provide an infrared radiation countermeasure of such type, having superior infrared radiation signature characteristics.

It is another object of the invention to provide a method of providing a transient infrared radiation reflectance signature, having utility in the obscuration of tactical and strategic military assets in warfare field operations.

Other objects and advantages of the present invention will be more fully apparent from the ensuing disclosure and appended claims.

SUMMARY OF THE INVENTION

The present invention, in a broad article aspect, relates to an infrared radiation-interactive article comprising a supported or unsupported oxidizable metal film of an infrared radiation-interactive size and shape, with an oxidation-promoting salt in contact with the metal film, so that in exposure to ambient moisture, the metal film is oxidizable to an infrared radiation non-interactive form.

As used herein, the term "infrared radiation-interactive" means that the article of the invention produces a reflection (back-scatter) or attenuation (absorption and/or dispersive scattering) of infrared radiation incident thereon. The term "infrared radiation non-interactive" means that the article in exposure to incident radiation has lost its interactive response characteristic, e.g., that the reflection or attenuation characteristic of the article has been substantially, and preferably essentially completely, diminished.

The term "oxidation-promoting salt" means that the salt in contact with the oxidizable metal in the article of the invention, in the presence of moisture, produces a greater extent and/or rate of oxidation of the metal, relative to a corresponding article in which the salt is absent.

In a specific embodiment, the article of the invention comprises an infrared radiation-reflective article comprising a non-conductive substrate having a thickness of an oxidizable metal coating thereon, with the metal coating in turn being coated with an oxidation-promoting salt, whereby the oxidizable metal coating is rapidly oxidized in use to an oxidized state in the presence of moisture.

The infrared radiation-reflective article in the broad practice of the invention is of a size and shape which renders it infrared radiation-reflective or infrared radiation-attenuative in character. Such size and shape characteristics may be readily determined by those skilled in the art without undue experimentation, but generally involve small-size flake, fiber, or particulate forms in which the main body of the article has a thickness dimension on the order of 30 microns or less (the main body being constituted by the oxidizable metal film alone in the case of an unsupported metal film, and the main body comprising the oxidizable metal film as well as the substrate element, when the oxidizable metal film is supported by being coated, laminated, or otherwise disposed on such substrate).

In the case of a particulate substrate having the oxidizable metal coating thereon, the thickness dimension of the particle is measured as the equivalent spherical diameter of the particle (the diameter of a spherical particle having the same volume as the particle in question). In the case of a non-particulate article in flake form, the surface of the article (transverse to its thickness) has an edge-to-edge dimension which desirably does not exceed 300 microns. In the case of the radiation-interactive article of the invention having a fiber conformation, the diameter of the fiber desirably does not exceed about 25 microns, and the length of such fiber desirably does not exceed 1 centimeter.

The main body of the radiation-interactive article of the present invention thus may be constituted by a metal particle, flake, or fiber of the oxidizable metal itself, with the surface of the article being coated, doped or otherwise treated with a salt, preferably a hygroscopic salt, which promotes the oxidation of the metal film in the presence of moisture, e.g., atmospheric relative humidity.

Alternatively, the article may comprise a substrate for supporting the oxidizable metal film, in which the substrate may for example comprise a non-conductive body in the desired conformation. The substrate body in such article is coated with metal, and the metal in turn is coated, doped or otherwise treated with a suitable salt, so that the metal is in contact with an oxidation-promoting salt in its subsequent use.

By way of specific example, the article of the invention in a flake conformation may comprise a substrate of mica or other suitable natural or synthetic material in the shape of a disk or platelet having a thickness of for example 0.1 micron, and a maximum edge-to-edge dimension which is on the order of 10 microns. The surface of such substrate element is coated with a thin film of an oxidizable metal, and the metal film in turn is coated, continuously or discontinously, with a salt which is enhancingly effective for the oxidation of the metal film in the presence of moisture.

The oxidizable metal may be of any suitable species, but preferably comprises aluminum, although iron, or other metals or metal blends, composites, and alloys, may advantageously be employed in the general practice of the invention.

The metal may be coated on the substrate, or alternatively may be provided as an unsupported metal film (e.g., metal flake), at any appropriate thickness, and typically does not exceed about 1.5 microns. The metal may be coated on a substrate by any suitable means and method, e.g., chemical vapor deposition, electroless plating, evaporative coating, etc.

In a broad method aspect, the present invention relates to a method of transiently altering an infrared radiation response, e.g., an infrared radiation signature, at a selected locus, comprising dispersing at the locus an infrared radiation interactively-effective amount of the infrared radiation-interactive article of the invention. The radiation-interactive article may be deployed in a quantity of such articles which is uniform in its dimensional and conformational characteristics. Alternatively, the radiation-interactive article may be provided in a mixture of different sizes and/or conformations of the article (e.g., the infrared radiation-interactive material may comprise a mixture of particulate articles of differing size (diameter) characteristics, or a mixture of two or more forms of flake, powder, and/or fiber infrared radiation-interactive articles.

In the use of the radiation-interactive article of the invention, the oxidizable metal film article is deployed at the desired locus, where it functions as an effective reflector, scatterer or absorber of infrared radiation incident on the article, depending on its shape, size and intended use. Once the metal film of the article has been corroded, e.g., by oxidation of the metal to form corresponding metal oxides and/or hydroxides, there is no longer any elemental metal to reflect, scatter, or absorb incident infrared radiation.

Other aspects and features of the invention will be more fully apparent from the ensuing disclosure and appended claims.

DETAILED DESCRIPTION OF THE INVENTION, AND PREFERRED EMBODIMENTS THEREOF

The disclosures of the following U.S. patent applications hereby are incorporated herein by reference in their entirety: U.S. application Ser. No. 08/273,356 filed Jul. 11, 1994, now allowed; U.S. application Ser. No. 07/734,199 filed Jul. 22, 1991, now U.S. Pat. No. 5,328,717; U.S. application Ser. No. 07/448,252 filed Dec. 11, 1989, now U.S. Pat. No. 5,034,274; U.S. application Ser. No. 07/449,708 filed Dec. 11, 1989, now U.S. Pat. No. 5,039,990; U.S. application Ser. No. 07/450,585 filed Dec. 11, 1989, abandoned; U.S. application Ser. No. 07/982,393 filed Nov. 27, 1992, now U.S. Pat. No. 5,352,519; and U.S. application Ser. No. 07/449, 695 filed Dec. 11, 1989, now U.S. Pat. No. 5,087,515. Specifically, the radiation-interactive articles of the invention can be fabricated in accordance with the teachings of the aforementioned application and patent disclosures, to provide the articles appropriate to the practice of the method of the present invention, in a given end use application.

The present invention is based on the discovery that an infrared radiation signature can be transiently altered for effective use as an electronic warfare countermeasure, by the provision of articles which may be deployed in a location of infrared radiation monitoring, wherein the article comprises an infrared radiation-interactively sized body, formed of or coated at least in part with an infrared radiation-reflective metal film which in exposure to ambient (e.g., atmospheric) moisture and ambient temperature conditions rapidly oxidizes to an infrared radiation non-interactive state.

Although described hereinafter in primary reference to use as an electronic warfare countermeasure, the article of the present invention is not thus limited in its utility, and may advantageously be employed for other purposes of a non-military, non-warfare character. Examples include the use of the infrared radiation-interactive article of the invention as: a search and rescue tool deployed by persons who are lost or otherwise at risk at sea or in remote terrain; a survey or cartographic tool, for determining locations; etc.

The salt usefully employed in the practice of the invention may comprise any suitable salt which promotes the oxidation of the metal film. Examples include sodium, calcium, potassium, copper, lithium, and iron salts, etc., whose anions include carbonates, halides, sulfates, etc.

In general, the salt materials, non-conductive substrates, and metals disclosed in prior U.S. application Ser. No. 08/273,356 filed Jul. 11, 1994 incorporated herein by reference, as well as the fabrication, and salt-doping application techniques therein disclosed, may be advantageously employed in the practice of the present invention.

Figure 1:
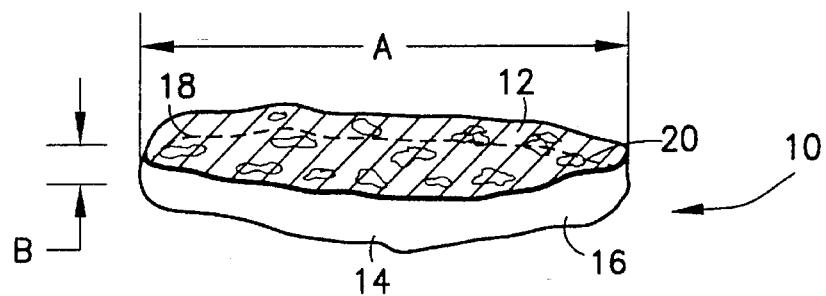
FIG. 1 is a perspective view of a flake conformation of an infrared radiation-interactive article according to one embodiment of the invention.

FIG. 1 is a perspective view of a flake conformation of an infrared radiation-reflective article 10 according to one embodiment of the invention. The article 10 comprises a main body portion having main top face 12 and main bottom face 14 defining a thickness B therebetween associated with the edge suface 16. The face 12 of the flake article has a maximum edge-to-edge dimension A. The dimension A may be for example 10 microns, and the dimension B may be for example 0.5 micron.

The flake article 10 shown in FIG. 1 may comprise a metal flake per se, of aluminum or other suitable suitable metal material. Alternatively, the article may comprise a main body portion which constitutes a substrate element which is separate and distinct in relation to the metal film. Thus, the main body portion of the article shown in FIG. 1 may for example comprise a flake of mica or other mineralic material, or of a non-mineralic material, e.g., of glass or polymeric (natural or synthetic) material, on which is coated a film 18 of oxidizable metal.

Regardless of whether the main body portion of the article is a metal film (flake) itself, or is a supportive element having coated thereon a metal film, the metal film is in contact with an oxidation-promoting salt 20, which as shown may be in the form of deposits (e.g, islands) of salt on the surface of the metal film, or alternatively the salt may be relatively continuous on the surface of the metal film, or as a still further alternative the salt may be codeposited or co-formed with the metal film, or otherwise provided so that the salt is in oxidation-promoting relationship to the metal film, and so that exposure of the metal film to environmental moisture causes the salt-contacted metal film to oxidize to a non-interactive state (relative to response to incident infrared radiation on the article).

The specific size, shape and conformation of the metal film article of the invention may be readily determined without undue experimentation for a given radiation exposure application, by the simple expedient of varying the size, shape and/or conformation of the article, and measuring the radar interaction characteristic of interest (reflectance, absorption, scattering) at specific relative humidity conditions simulative of the end use application of interest.

In general, the dimensions of the article of the invention are selected so that the main body of the article (either the metal film itself in the case of an unsupported metal film, or the substrate element in the case in a supported :metal film) has a thickness dimension on the order of 30 microns or less, more preferably on the order of 25 microns or less, and most preferably on the order of 25 microns or less.

In the case of a particulate substrate, such thickness dimension is the diameter of the particle. In the case of a non-particulate article in flake form, the surface of the substrate article (transverse to its thickness) has an edge-to-edge dimension which desirably does not exceed 200 microns. In the case of a fiber conformation, the diameter of the article generally does not exceed 100 microns, more preferably does not exceed about 30 microns, and most preferably does not exceed about 25 microns, while the fiber length typically does not exceed 1 centimeter.

The substrate may be a metal particle, flake, or fiber itself, or alternatively, the substrate may be a non-conductive body in the desired conformation, with such substrate body being coated with metal, and doped or otherwise treated with a suitable salt, so that the metal is in contact with an oxidation-promoting salt in its subsequent use. In a preferred aspect of the present invention, the substrate of the article is formed of a biodegradeable material, e.g., a water-soluble material, which is readily broken down in the environment in which the article is deployed.

Figure 2:
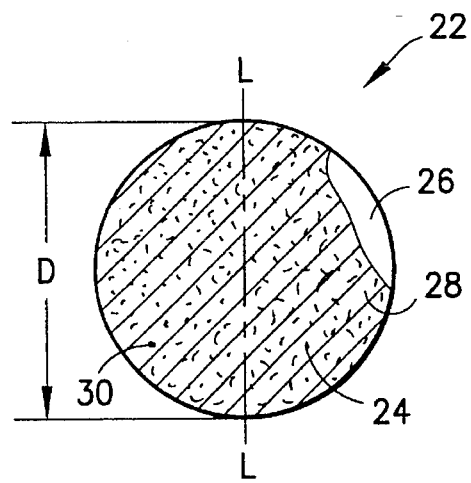
FIG. 2 is a front elevation view, partially broken away, of a particulate conformation of an infrared radiation-interactive article according to another embodiment of the invention.

FIG. 2 is a front elevation view, partially broken away, of a particulate conformation of an infrared radiation-reflective article 22 according to another embodiment of the invention. The article 22 is spherically shaped, being symmetrical about axis L—L, with a diameter D, which as indicated may be on the order of 1.5 microns or less, e.g., 0.2 to 1.0 micron. The article 22 in the embodiment shown comprises a non-metal spherical support body whose outer surface 26 has a coating 28 of oxidizable metal thereon, wherein the metal film comprises or is otherwise in contact with the oxidation-promoting salt, e.g, in the surface-doped salt deposits 30 shown in FIG. 2.

Figure 3:
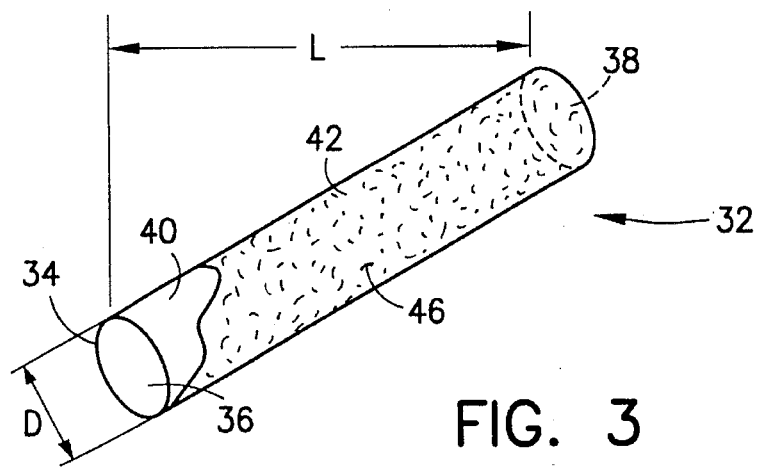
FIG. 3 is a perspective view, partially broken away, of a fiber conformation of an infrared radiation-interactive article according to a further embodiment of the invention.

FIG. 3 is a perspective view, partially broken away, of a fiber conformation of an infrared radiation-reflective article 32 according to a further embodiment of the invention. In this embodiment, the article 32 comprises a fiber substrate 34 which may for example be formed of a soluble material such as boria which in the presence of water is dissolvable to dissipate the support element of the article. The substrate 34 has respective circular-shaped end faces 36 and 38 of diameter D, with a main cylindrical outer surface 40 defining a length L of the fiber and having coated thereon the metal film 42 doped with salt deposits 46. The fiber shown in FIG. 3 may alternatively comprise a metal fiber which is wholly formed of oxidizable metal and appropriately fabricated so that the metal thereof is in contact with a suitable salt promotor material for the desired oxidation of the metal.

As an illustrative example of radiation-interactive articles of the present invention, an iron-coated glass fiber (E-glass, Owens-Corning D filament) having a diameter of 4.8 microns, may be provided with an iron coating on the fiber outer surface which is 0.075 micron in thickness. The metal coating on such fiber article may be doped with iron (III) chloride to yield an oxidatively susceptible metal-coated fiber substrate article. As another example, a glass fiber of the same material (E-glass, Owens-Corning D filament) may have a diameter of 25 microns, and is coated with a 0.1–1 micron thickness of an oxidizable metal coating, with the metal coating being doped with a hygroscopic salt at a concentration of less than 3% by weight of salt, based on the weight of the metal coating, to facilitate the rapid oxidation of the metal coating in use of the article.

In a particularly advantageous embodiment of the invention, aluminum powders aluminum flake materials, and aluminum coated finely divided substrates are doped with a salt to effect a temporal infrared radiation absorber. Small amounts of salt applied to the surface of the aluminum causes corrosion of the metal surface in exposure to ambient moisture which converts the metal to an oxide or hydroxide. Prior to such corrosion, finely divided aluminum and aluminum coated finely divided substrates may be deployed to advantageously function as good scatterers or effective attenuators of IR radiation. Once the aluminum film has been corroded, there is no longer any metal to reflect incident radiation, nor to carry electrical current if the article subsequently contacts electrical components or assemblies.

While the invention has been described herein with reference to specific embodiments and features, it will be appreciated that the utility of the invention is not thus limited, but encompasses other variations, modifications, and alternative embodiments, and accordingly the invention therefore is to be broadly construed as comprehending all such alternative variations, modifications, and other embodiments within its spirit and scope.

What is claimed is:

1. An infrared radiation-interactive article comprising a supported or unsupported oxidizable metal film of an infrared radiation-interactive size and shape, with an oxidation-promoting salt in contact with the metal film, arranged so that in exposure to ambient moisture, the metal film is oxidizable to an infrared radiation non-interactive form.

2. An infrared radiation-interactive article according to claim 1, wherein said size and shape, and the electromagnetic properties of the metal film, render the article infrared radiation-reflective in character.

3. An infrared radiation-interactive article according to claim 1, wherein said size and shape, and the electromagnetic properties of the metal film, render the article infrared radiation-absorptive in character.

4. An infrared radiation-interactive article according to claim 1, wherein said size and shape, and the electromagnetic properties of the metal film, render the article infrared radiation-reflective and radiation-absorptive in character during said exposure.

5. An infrared radiation-interactive article according to claim 1, wherein said metal film is supported on a non-conductive substrate.

6. An infrared radiation-interactive article according to claim 1, comprising a main body including the unsupported film, or a substrate element for said supported metal film, wherein the main body has a thickness dimension not exceeding 30 microns.

7. An infrared radiation-interactive article according to claim 6, wherein the main body has a flake conformation including main surfaces defining a thickness therebetween, with a thickness dimension not exceeding 30 microns, and an edge-to-edge dimension not exceeding 300 microns.

8. An infrared radiation-interactive article according to claim 6, wherein the main body has a fiber conformation, with a fiber diameter not exceeding 25 microns, and a fiber length not exceeding 1 centimeter.

9. An infrared radiation-interactive article according to claim 6, wherein the main body has a particle conformation, with an equivalent spherical diameter not exceeding 30 microns.

10. An infrared radiation-interactive article according to claim 6, wherein the main body comprises a substrate element including a mica material.

11. An infrared radiation-interactive article according to claim 1, wherein said oxidizable metal film is supported on a biodegradeable substrate.

12. An infrared radiation-interactive article, comprising a supported or unsupported an oxidation-promoting salt in contact with the aluminum film, arranged so that in oxidizable aluminum film of an infrared radiation-interactive size and shape, with exposure to ambient moisture, the aluminum film is oxidizable to an infrared radiation non-interactive form.

13. An infrared radiation-interactive article according to claim 1, wherein the metal film has a thickness not exceeding about 1.5 microns.

14. An infrared radiation-interactive article according to claim 1, wherein the salt comprises a cation selected from the group consisting of calcium, potassium, copper, lithium, and iron, and an anion selected from the group consisting of carbonates, sulfates, and halides.

15. An infrared radiation-interactive article comprising a supported oxidizable metal film of an infrared radiation-interactive size and shape, wherein the oxidizable metal film is supported on a non-metallic substrate element, and with an oxidation-promoting salt in contact with the metal film, arranged so that in exposure to ambient moisture, the metal film is oxidizable to an infrared radiation non-interactive form.

* * * * *

UNITED STATES PATENT AND TRADEMARK OFFICE
CERTIFICATE OF CORRECTION

PATENT NO. : 5,571,621
DATED : November 5, 1996
INVENTOR(S) : Stevens, et al.

It is certified that error appears in the above-indentified patent and that said Letters Patent is hereby corrected as shown below:

| | |
|---|---|
| Column 1, Line 49 | "modem" should be --modern-- |
| Column 5, Line 66 | ":metal" should be --metal-- |
| Column 8, Line 23 | after "unsupported" insert --oxidizable aluminum film of an infrared radiation-interactive size and shape, with-- |
| Column 8, Line 24 | after "arranged so that in" delete --oxidizable aluminum film of an infrared radiation-interactive size and shape, with-- |

Signed and Sealed this

Twenty-ninth Day of July, 1997

Attest:

BRUCE LEHMAN

Attesting Officer        Commissioner of Patents and Trademarks